(12) United States Patent
Reinck (10) Patent No.: US 8,911,013 B2
(45) Date of Patent: Dec. 16, 2014

(54) SAFETY SEAT FOR MOTOR VEHICLES

(75) Inventor: Wilko Reinck, Bad Sassendorf (DE)

(73) Assignee: Schroth Safety Products GmbH, Arnsberg (DE)

( * ) Notice: Subject to any disclaimer, the term of this patent is extended or adjusted under 35 U.S.C. 154(b) by 357 days.

(21) Appl. No.: 13/191,168

(22) Filed: Jul. 26, 2011

(65) Prior Publication Data

US 2012/0025570 A1 Feb. 2, 2012

Related U.S. Application Data

(60) Provisional application No. 61/376,299, filed on Aug. 24, 2010.

(30) Foreign Application Priority Data

Jul. 28, 2010 (DE) .................. 10 2010 032 570

(51) Int. Cl.
| | |
|---|---|
| A47C 3/027 | (2006.01) |
| B60N 2/427 | (2006.01) |
| B60N 2/24 | (2006.01) |
| B60N 2/42 | (2006.01) |
| B64D 25/04 | (2006.01) |
| B64D 11/06 | (2006.01) |

(52) U.S. Cl.
CPC .......... *B60N 2/4242* (2013.01); *B60N 2/42754* (2013.01); *B60N 2/24* (2013.01); *B60N 2/42709* (2013.01); *B64D 25/04* (2013.01); *B64D 2011/0627* (2013.01)
USPC .................. 297/216.13; 297/216.1; 297/338; 297/484

(58) Field of Classification Search
USPC .............. 297/338, 337, 344.18, 344.12, 484, 297/452.2, 383, 216.1, 216.13
See application file for complete search history.

(56) References Cited

U.S. PATENT DOCUMENTS

| | | | | | |
|---|---|---|---|---|---|
| 1,861,938 | A | * | 6/1932 | Roche ...................... | 297/344.18 |
| 2,736,566 | A | * | 2/1956 | Hartl ............................... | 280/29 |
| 3,885,810 | A | * | 5/1975 | Chika ........................... | 280/748 |
| 4,150,805 | A | * | 4/1979 | Mazelsky ................... | 244/122 R |
| 4,408,738 | A | * | 10/1983 | Mazelsky ................... | 244/122 R |

(Continued)

OTHER PUBLICATIONS

First Official Communication from the Examining Division of the German Patent and Trademark Office.

(Continued)

*Primary Examiner* — David R Dunn
*Assistant Examiner* — Alexander Harrison
(74) *Attorney, Agent, or Firm* — Kane Kessler, P.C.; Paul E. Szabo (57) ABSTRACT

A safety seat for a motor vehicle includes a seat unit and a back unit having an upper part and a lower part. The safety seat can be connected by way of the upper part to the structure of a motor vehicle, and the lower part can be dropped with respect to the upper part. The lower part is guided on the upper part and is connected to the upper part by at least one energy-absorbing support strap. The seat unit has a forward part connected in articulated fashion to the upper part of the back unit, and a rear part which is connected in articulated fashion to the lower part of the back unit. The rear part of the seat unit drops farther than the forward part of the seat unit when a force resulting from an accident or an explosion acts on the vehicle.

10 Claims, 7 Drawing Sheets

(56) References Cited

U.S. PATENT DOCUMENTS

| | | | | |
|---|---|---|---|---|
| 4,993,778 | A * | 2/1991 | Colin et al. | 297/452.2 |
| 5,295,729 | A * | 3/1994 | Viano | 297/216.14 |
| 5,449,214 | A * | 9/1995 | Totani | 296/68.1 |
| 5,556,160 | A * | 9/1996 | Mikami | 297/216.1 |
| 5,636,424 | A * | 6/1997 | Singer et al. | 29/407.01 |
| 6,056,366 | A * | 5/2000 | Haynes et al. | 297/452.18 |
| 6,205,600 | B1 * | 3/2001 | Sedlack | 5/94 |
| 6,378,939 | B1 * | 4/2002 | Knoll et al. | 297/216.1 |
| 6,409,243 | B1 * | 6/2002 | Hansen | 296/68.1 |
| 6,601,923 | B2 * | 8/2003 | Pond et al. | 297/484 |
| 8,419,127 | B1 * | 4/2013 | Wilhelm et al. | 297/216.13 |
| 8,641,140 | B2 * | 2/2014 | Swierczewski | 297/216.15 |
| 2004/0084953 | A1 * | 5/2004 | Hansen | 297/484 |
| 2006/0082200 | A1 * | 4/2006 | Woellert et al. | 297/250.1 |
| 2008/0143158 | A1 * | 6/2008 | Roodenburg et al. | 297/284.4 |
| 2010/0060060 | A1 * | 3/2010 | Hansen | 297/339 |

OTHER PUBLICATIONS

German Office Action dated Jun. 3, 2011.

* cited by examiner

SAFETY SEAT FOR MOTOR VEHICLES

RELATED APPLICATIONS

This application claims the benefit of U.S. Provisional Application No. 61/376,299, filed Aug. 24, 2010, the entire disclosure of which is incorporated by reference.

BACKGROUND OF THE INVENTION

The invention pertains to a safety seat for motor vehicles with the features of claim 1.

According to the state of the art, safety seats in armored motor vehicles are disconnected from the vehicle's floor, so that the forces which act when, for example, the vehicle travels over a mine are not transmitted directly by the structure of the seat to the vehicle occupant. Driving over a mine often has the result that not only the vehicle as a whole is lifted from the ground but also that the floor of the vehicle is buckled inward to a considerable extent. Seats attached to the vehicle floor thus transmit to the vehicle's occupants not only the impacts and vibrations encountered during normal driving but also the much greater forces of acceleration which occur when a mine explodes or the vehicle is involved in an accident.

It has already been proposed that safety seats be disconnected from the vehicle's structure by suspending the seats by the use of bracing straps. Bracing straps have the property of being unable to transmit compressive forces. The shockwave caused by a mine explosion is therefore not transmitted to the seat and thus not to the occupant. Seats which are held by bracing straps, however, require a larger number of fixation points than seats with rigid connections.

On the basis of U.S. 2005/0264082 A1, a seat for an armored land vehicle which is fastened to an upper suspension system for protection against mines and which comprises a seat cover and a restraint system belongs to the state of the art. The suspension system is formed by a suspension linkage, which is completely disconnected from the floor of the vehicle. A U-shaped seat frame is supported in articulated fashion on the suspension linkage and is connected to upper suspension points by the elastic suspension belts of the seat cover, wherein the elastic suspension belts comprise predetermined, energy-consuming break points. This light-weight arrangement is able to disconnect the seat from the vehicle's floor, but, in cases where the seat surface drops, it is possible for a situation to occur in which the belted-in person slides under the provided lap belt (submarining). This is a problem especially when the predetermined energy-consuming break points are torn apart not because of a mine explosion but because of a traffic accident of the vehicle, wherein, depending on the arrangement of the seat, the submarining effect can have very negative effects.

WO 02/26524 A1 discloses a safety seat with a damping mechanism, which is arranged in the area of the backrest. The seat structure comprises a seat unit and a back unit. The back unit comprises an upper part, which is connected to the structure of the motor vehicle, and a lower part, which can be dropped with respect to the upper part and which is connected to the seat unit. The energy-attenuating damper is arranged between the lower part and the stationary upper part and consists of a bending mechanism. When the lower part shifts with respect to the upper part of the back unit, a metal band is bent by the bending mechanism. As a result of the work of deformation, at least some of the energy which acts on the occupants when the vehicle drives over a mine, for example, is absorbed. The lower part of the seat drops as a whole. The loads on the occupants are reduced, but the energy-attenuating damper is comparatively complicated.

SUMMARY OF THE INVENTION

The invention is based on the goal of providing a light-weight safety seat, especially for use in vehicles which can be subjected to high impact-like loads in the vertical direction such as aircraft, especially helicopters, during a landing or a crash, and also for use in armored vehicles which are subject to the danger of land mines, wherein the safety seat is able to absorb a significant portion of the g-forces acting in the vertical direction and thus reduce the effects on the occupants, while at the same time the seat makes it possible for the occupants to be held securely in place even though disconnected from the floor of the vehicle without the occurrence of the disadvantageous submarining effect.

This goal is achieved by a safety seat with the features of claim 1. Advantageous elaborations of the inventive idea are objects of the sub-claims.

The inventive safety seat comprises a seat unit and a back unit. The back unit comprises an upper part and a lower part. The upper part of the safety seat can be connected to a structural part of a motor vehicle. The lower part can be dropped with respect to the upper part. The motor vehicle structure to which the safety seat can be attached can be in particular a section of the wall of the vehicle. In theory it is also possible for the back unit to be attached to the roof of the passenger compartment. The only essential point is that the lower part of the back unit can be dropped with respect to the upper part, as a result of which it becomes disconnected from the floor of the motor vehicle.

The lower part is guided on the upper part. It is connected to the upper part by way of at least one energy-absorbing support strap.

In addition, the forward part of the seat unit is connected in articulated fashion to the upper part of the back unit. The lower part of the back unit is connected at the same time to a rear part of the seat unit. The connection is achieved in such a way that the rear part of the seat unit drops farther than the forward part of the seat unit, especially in the case of g-forces acting in the vertical direction, when a force resulting from an accident or an explosion acts on the motor vehicle.

An advantage of the inventive seat unit in addition to the disconnection from the vehicle floor is that submarining is avoided, because only the rear part of the seat unit, not the forward part of the seat unit, drops. Instead, the forward part is actually lifted. The person sitting in the seat is thus forced to bend his thighs more closely toward the upper body in the sitting position, so that a lap belt, which is connected in particular to the rear part of the seat unit, rests tightly on the person. Submarining is prevented.

Another advantage is that the energy-absorbing means in the form of a support strap is very light in weight. It also occupies only a small amount of space but is at the same time extremely effective at absorbing energy. In addition, these types of support straps are relatively low in cost, so that replacing a support strap costs little, and because installation is technically simple, a strap can be replaced quickly and easily.

Energy is absorbed by the support strap in particular as a result of the fact that the support strap comprises a section with at least two layers of strap material lying on top of each other, which are connected to each other by at least one tear seam or corresponding adhesive bonds configured to act as a predetermined break point. The basic principle of a predetermined break point such as this is that the length of a support strap basically does not increase when under standard load, but it does become longer as soon a certain load level is exceeded. When this load level is reached, the layers of strap material lying on top of each other come apart as a result of the destruction of the tear seams or adhesive bonds. The load level is designed to be "falling", because as a result the forces change or are absorbed in a favorable manner with respect to the person to be protected.

The inventive safety seat preferably comprises a bracing strap, which connects the forward part of the seat unit to the upper part of the back unit. So that an anti-submarining effect can be obtained, the center of rotation at which the bracing strap is connected to the seat unit is a greater horizontal distance away from the back unit than the center of gravity of a person sitting on the seat. The desired anti-submarining effect is obtained under the assumption that the g-forces in question are acting essentially in the vertical direction.

The center of rotation for the lateral bracing straps is preferably located a certain distance away from the forward edge of the forward part of the seat unit, so that, when the rear part drops, the forward part of the seat unit is simultaneously lifted. This improves the anti-submarining effect of the inventive safety seat even more.

The inventive safety seat also comprises a safety belt arrangement with shoulder belts, wherein the shoulder belts pass around the upper part of the back unit and are pulled tight when the lower part of the back unit drops. In particular, the shoulder belts are attached to the lower part of the back unit. When the shoulder belts are pulled tight, the upper body is drawn firmly against the back unit. The tightening of the shoulder belts occurs exclusively as a result of the dropping of the lower part of the back unit. For this purpose, the end sections of the shoulder belt which pass over the upper part of the back unit can be connected to the lower part of the back unit, so that the shoulder belts are pulled toward the rear in the area of the shoulders. Alternatively, it is also conceivable that the upper parts of the shoulder belts could be fastened to the upper part of the back unit, whereas the lower ends of the shoulder belts would be connected to the lower part of the back unit, so that they are pulled tight when the rear part of the seat or the lower part of the back unit drops.

Of course, it is also possible for both ends of the shoulder belts, that is, both the bottom end and also the top end of each belt, to be connected to the lower part of the back unit after passing around the upper part of the back unit.

The back unit itself does not necessarily form the backrest, against which the upper body of the person rests. Instead, a backrest unit made of textile fabric can be arranged between the bracing straps which hold the forward part of the seat and can thus be held in place by them. The bracing straps are pulled tight by the weight of the person on the seat, which also means that the backrest unit retains its shape.

The backrest unit can be configured in such a way that it is located a certain distance away from the back unit with the support straps, so that the backrest unit does not interfere with the support straps. It is also conceivable, of course, that the support straps could give additional support to the backrest unit.

To ensure the complete disconnection of the person from the vehicle floor, it is provided that a footrest is connected to the lower part of the back unit, this footrest extending underneath, a certain distance away from and parallel to, the seat unit without touching the floor of the vehicle. The distance is selected so that the person can rest his/her feet comfortably. The footrest unit can be telescoping, wherein, when not in use, it can be collapsed and thus will not project interferingly beyond the forward part of the seat unit. Because it is connected to the lower part of the back unit, the footrest drops at the same time that the seat unit does, but even so the footrest still does not come in contact with the floor of the motor vehicle. The person therefore remains disconnected from the floor of the vehicle even after the seat unit has dropped.

According to an advantageous elaboration, the support strap comprises means for indicating an overload. This can be a color mark, for example, which is located between the strap layers lying on top of each other and which becomes visible only after the predetermined break point has failed. This is a clear sign that the support strap must be replaced. An indicator of this type requires no additional space outside the support strap, is light in weight, and is also in a protected location.

BRIEF DESCRIPTION OF THE DRAWINGS

The invention is explained in greater detail below on the basis of exemplary embodiments, which are illustrated in the drawings.

DETAILED DESCRIPTION

Figure 1:
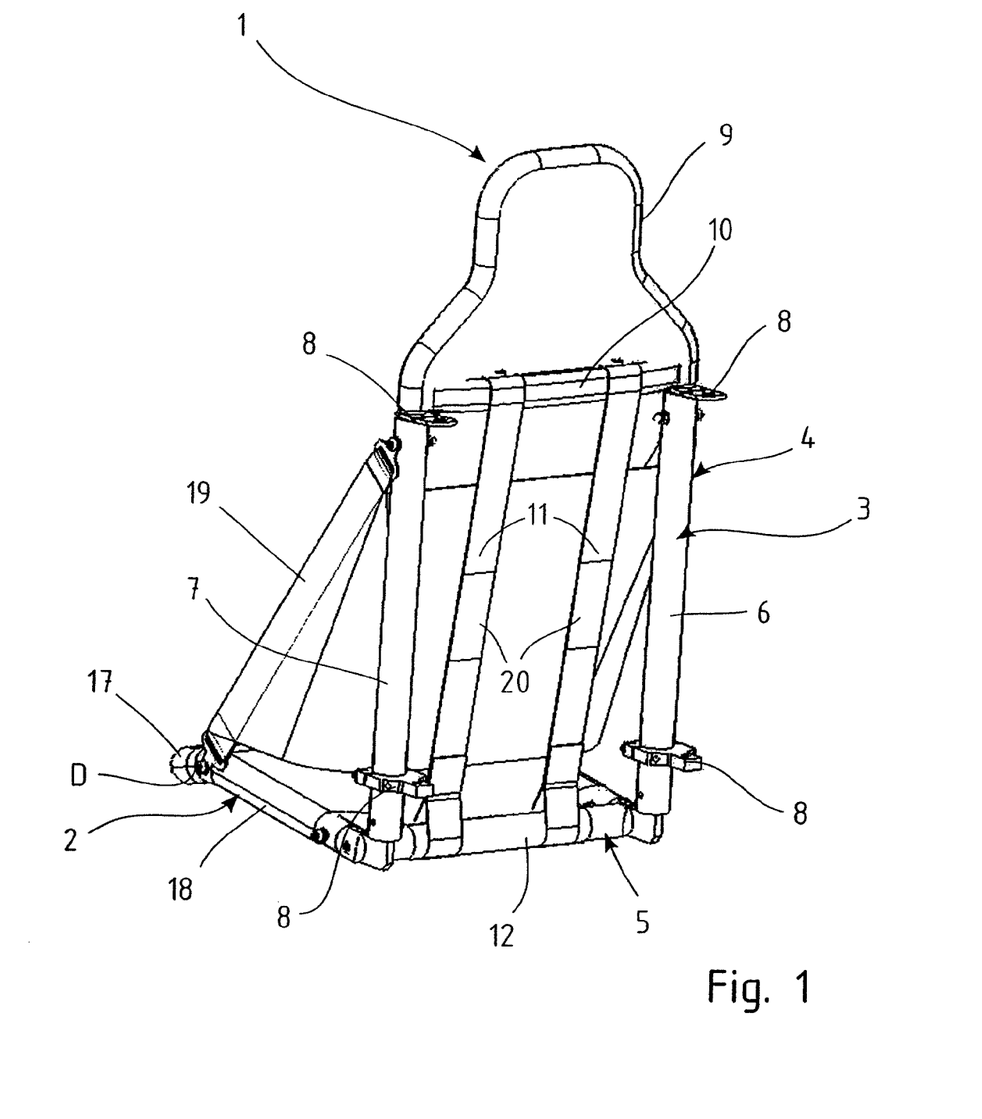
FIG. 1 shows a rear view of a first embodiment of a safety seat.

FIG. 1 shows a safety seat 1. This safety seat 1 can be installed in a motor vehicle (not shown). This can be in particular an armored land vehicle. Installation in an aircraft or watercraft is also conceivable.

The safety seat 1 comprises as its essential components a seat unit 2 and a back unit 3. The back unit 3 consists in turn of an upper part 4 and a lower part 5, which can be shifted downward with respect to the upper part. Only the upper part 4 of the back unit 3 is intended to be connected to the structure of the motor vehicle. For this purpose, two guide tubes 6, 7, a certain distance apart, are provided on the frame-like upper part 4. Fastening means 8, by means of which the guide tubes 6, 7 are firmly connected to the structure of the motor vehicle, are arranged at the top end of each guide tube 6, 7 and also in the area of the bottom ends of the guide tubes 6, 7.

The lower fastening means 8 are clamps, which extend around the guide tubes 6, 7 with a clamping action. Because of their clamping type of attachment, these fastening means 8 can be attached slightly higher or slightly lower to the guide tubes 6, 7, so that the distance between the upper and the lower fastening points 8 can be varied. This facilitates the adjustment of the installation of the safety seat 1 to suit different mounting situations and vehicle body designs.

In particular, the guide tubes 6, 7 are arranged vertically. In this exemplary embodiment, the guide tubes can also be slightly slanted, that is, mounted at an angle of 10-20° to the vertical, so that the back unit acquires a slight slant.

At the top end of the back unit 3 there is a headrest 9. The headrest 9 consists of a frame component, the width of which tapers down toward the top and which is connected to the top ends of the guide tubes 6, 7. This frame component is covered by a textile covering. At the bottom end of the headrest 9, between the two guide tubes 6, 7, there is a cross piece 10, on which two support straps 11 are attached, these straps extending parallel to each other and a certain distance apart. The support straps 11 extend from the cross piece 10 downward to a lower cross piece 12, which is a component of the lower part 5 of the back unit 3.

Figure 2:
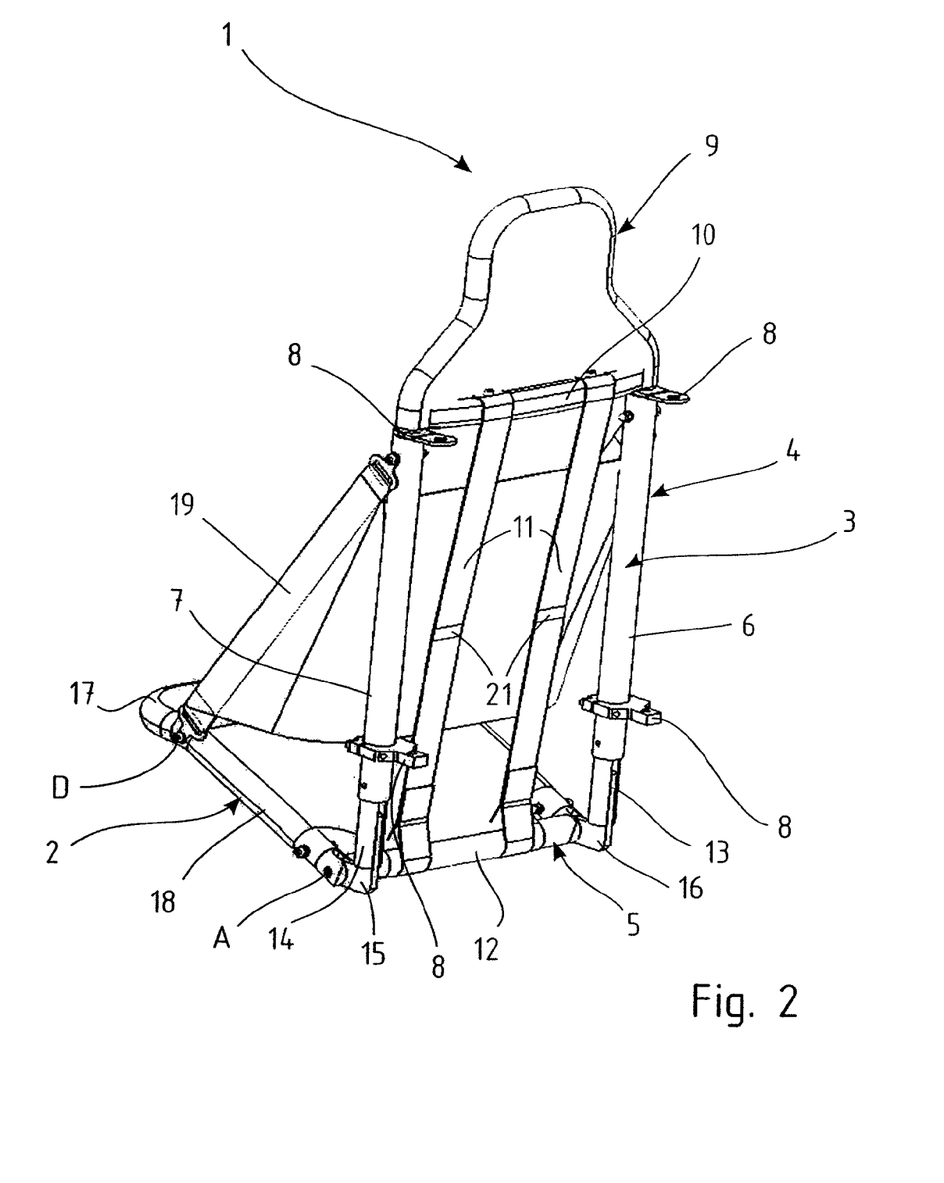
FIG. 2 shows a rear view of the safety seat of FIG. 1, wherein the lower part of the back unit is lowered.

The lower part 5 can be shifted in a translational manner versus the upper part 4 of the back unit 3, as can be seen in FIG. 2. The lower part 5 has insertion profiles 13, 14, which fit into the associated guide tubes 6, 7 and are guided by them. The insertion profiles 13, 14 can be shifted only in a translational manner. The insertion profiles 13, 14 are rigidly connected to the lower cross piece 12. Connecting elements 15, 16 connect the insertion profile 13, 14 in question to the lower cross piece 12.

The connecting elements 15, 16 also have a connection for the seat unit 2. Here the pivot axis A, i.e., the point where the connecting elements 15, 16 and the seat unit 2 are joined, lies on the side of the insertion profiles 13, 14 facing away from the lower cross piece 12. In other words, the lower cross piece 12 is located between the pivot axis A of the seat unit 2 and the insertion profiles 13, 14, which, in this embodiment of the invention, proceed upward from the connecting elements 15, 16. The connecting elements 15, 16 thus have, so to speak, an L-shaped configuration. The lower cross piece 12 is thus also offset from the upper cross piece 10 in the direction toward the seat unit 2, so that the support straps 11 extend at an angle to the plane defined by the straight guide tubes 6, 7.

The seat unit 2 has a forward part 17 and a rear part 18. The rear part 18 is connected pivotably to the lower part 5 of the back unit 3 by the previously mentioned pivot axis A. As a result, the entire seat unit 2 can be configured as a folding seat and folded up when not in use. Between the forward part 17 and rear part 18 there is a working point for a bracing strap 19, which connects the short, forward part 17 of the seat unit 2 to the upper part 4 of the back unit 3. The bracing strap 19 extends for this purpose to the top end of the upper part 4, namely, to a point just below the fastening means 8, which, in the present exemplary embodiment, is located just below the upper cross piece 10.

The bracing strap 19 is connected in an articulated manner to the forward part 17. The center of rotation D, where the bracing strap 19 is connected to the seat unit 2, is located a greater horizontal distance away from the back unit 3 than the center of gravity (not shown) of a person sitting on the safety seat 1. This is also true for the reason that the forward part 17 is much shorter than the rear part 18 of the seat unit. As a result, only the thigh of the person is located in the area of the forward part 17, whereas the upper body is behind the center of rotation D near the back unit 3. The overall center of gravity of the person is therefore closer to the back unit 3.

When the support straps 11 are put under load by vertically acting g-forces, such as those which occur during a helicopter crash or a mine explosion under a motor vehicle, acceleration forces are introduced into the back unit 3 via the fastening means 8. The upper part 4 of the back unit 3 is shifted. Via the support straps 11, a force is also introduced into the lower part 5. Each of the support straps 11, however, has a strap section 20 where several layers of strap material lie on top of each other (not shown), these layers being connected to each other by at least one tear seam or an adhesive bond. When a certain load level is exceeded, such as during an explosion or a crash, the predetermined break points are destroyed and the strap layers lying on top of each other come apart. The support strap 11 thus become longer, with the result that the lower part 5 drops downward under the weight of the person sitting on the seat unit 2. The loads transmitted to the occupants are therefore much weaker than would be the case with a fixed structure.

The predetermined break points of the support straps 11 preferably have a falling load level.

In addition, the support strap 11 can be provided with indicator means in the area of the predetermined break points; these indicators are visible only after the predetermined break points have been destroyed. It is thus possible to recognize immediately when these support straps 11 must be replaced.

Another important aspect is that the bracing strap 19 may not be connected to a movable part of the back unit 3 but rather only to the fixed upper part 4 of the back unit 3. This has the effect of reducing the angle between the upper body and the thighs of the occupant. An anti-submarining effect is thus obtained, which will be described in greater detail below on the basis of FIGS. 3 and 4.

Figure 3:
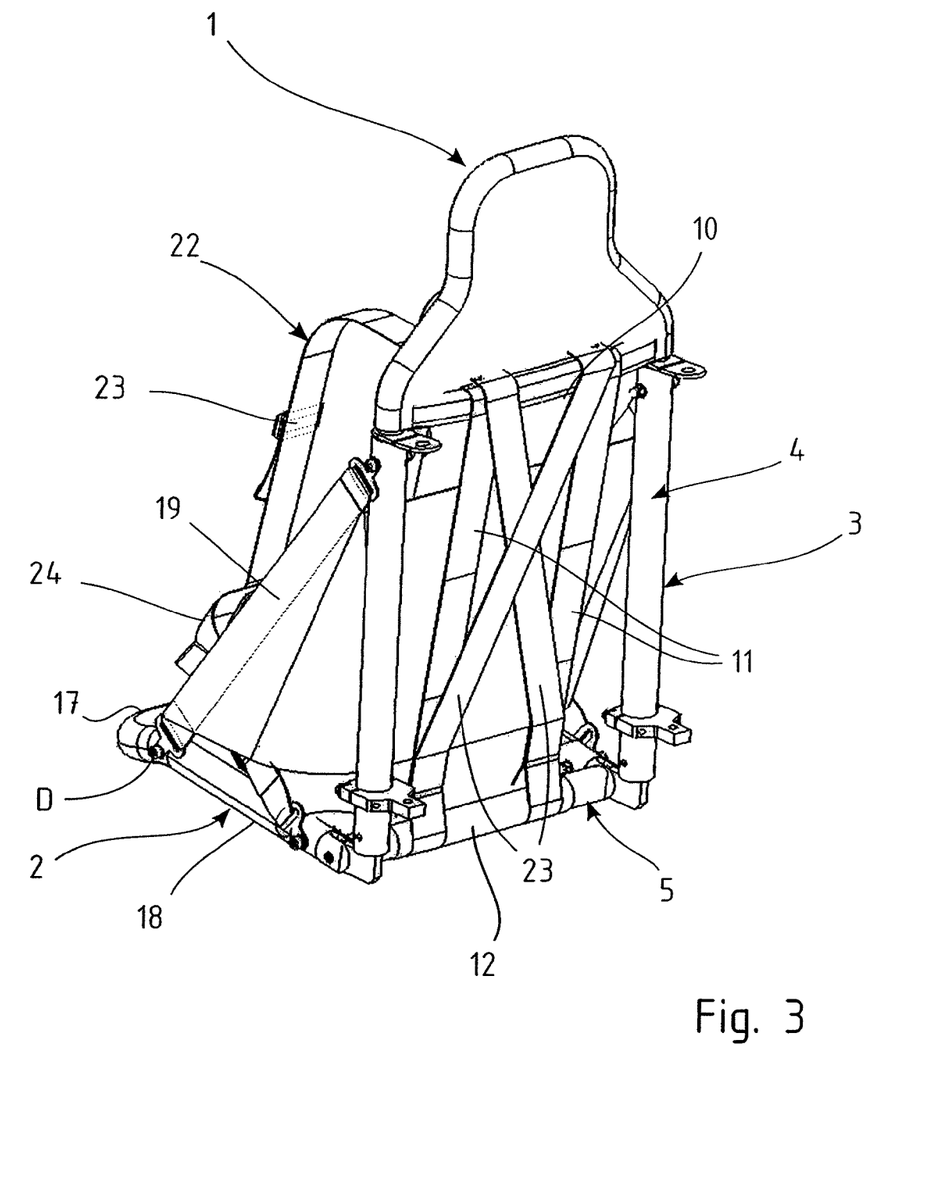
FIG. 3 shows a rear view of another embodiment of a safety seat.
Figure 4:
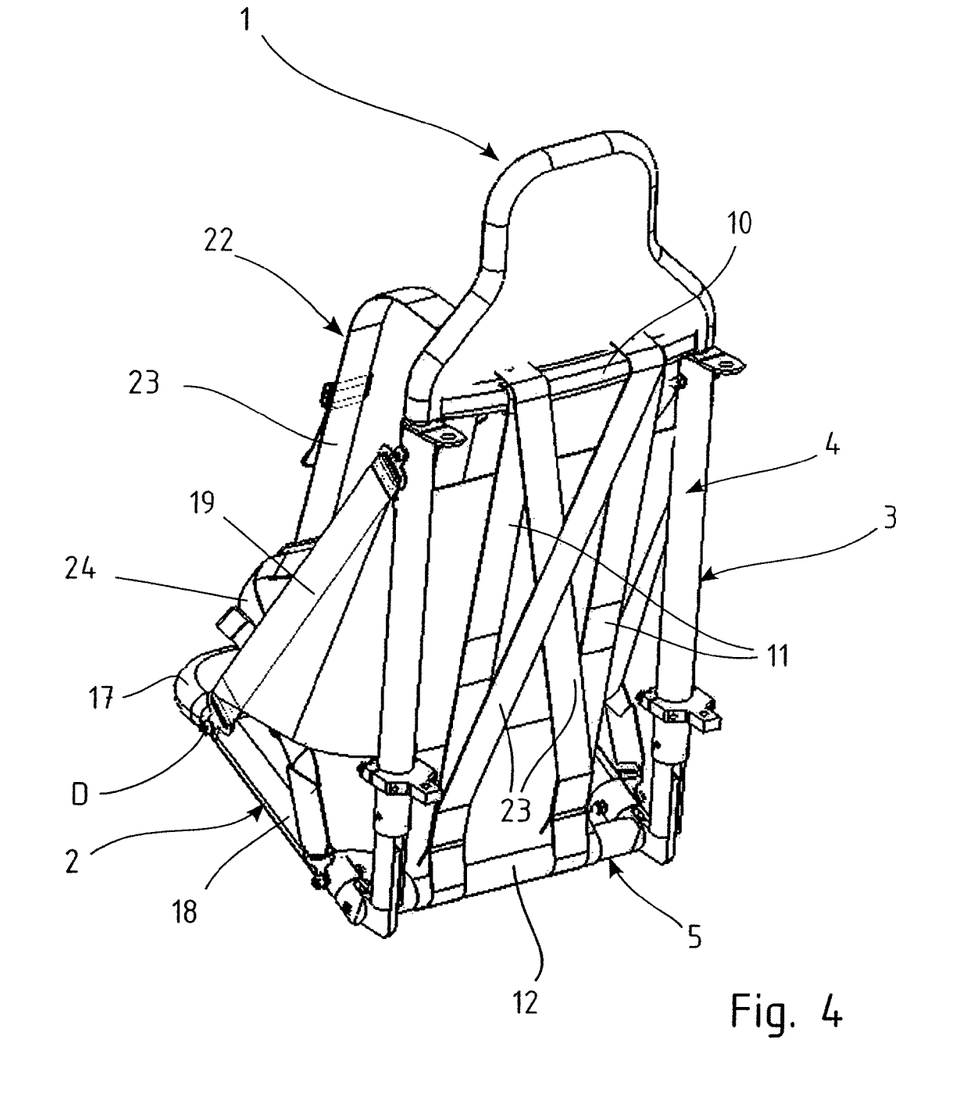
FIG. 4 shows the safety seat of FIG. 3 in the lowered position.

The embodiment according to FIGS. 3 and 4 is basically the same as that of FIGS. 1 and 2, so that the reference numbers used there can continue to be used. What is added is a safety belt arrangement 22 with shoulder belts 23 and a lap belt 24. The shoulder belts 23 are guided over the upper cross piece 10, cross each other as they run down the rear side of the back unit 3, and are connected at their bottom ends to the ends of the support straps 11. When the predetermined break points are destroyed and thus the lower part 5 drops, as shown in FIG. 4, the top ends of the shoulder belts 23 are pulled backward as a result of the downward movement of the lower part 5. The occupant is thus pressed against the safety seat 1 and held in the seated position.

The lap belt 24, furthermore, is connected a short distance away from the pivot axis A of the seat unit 2 to the U-shaped frame structure of the seat unit 2. When the seat unit 2 drops as shown in FIG. 4, the lap belt 24 is also pulled downward at its working points, whereas simultaneously the forward part 17 of the seat unit 2 rises. As a result, the occupant is held securely on the seat. It is impossible for the occupant to submarine.

A backrest unit 25 is arranged between the bracing straps 19, which extend along the long sides of the safety seat 1. The shell-like backrest unit 25 consists of textile fabric and is held in place exclusively by the bracing straps 19.

Figure 5:
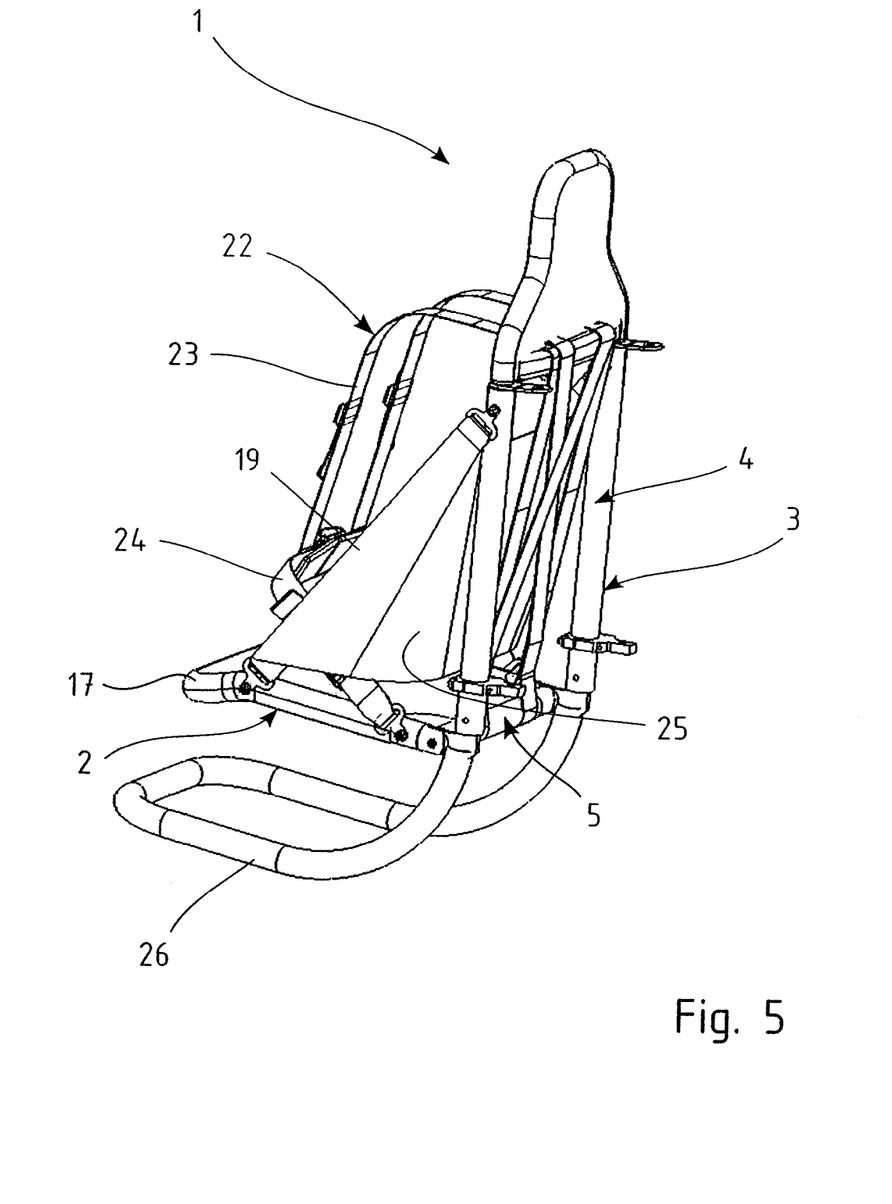
FIG. 5 shows an angled rear view of another embodiment of a safety seat.
Figure 6:
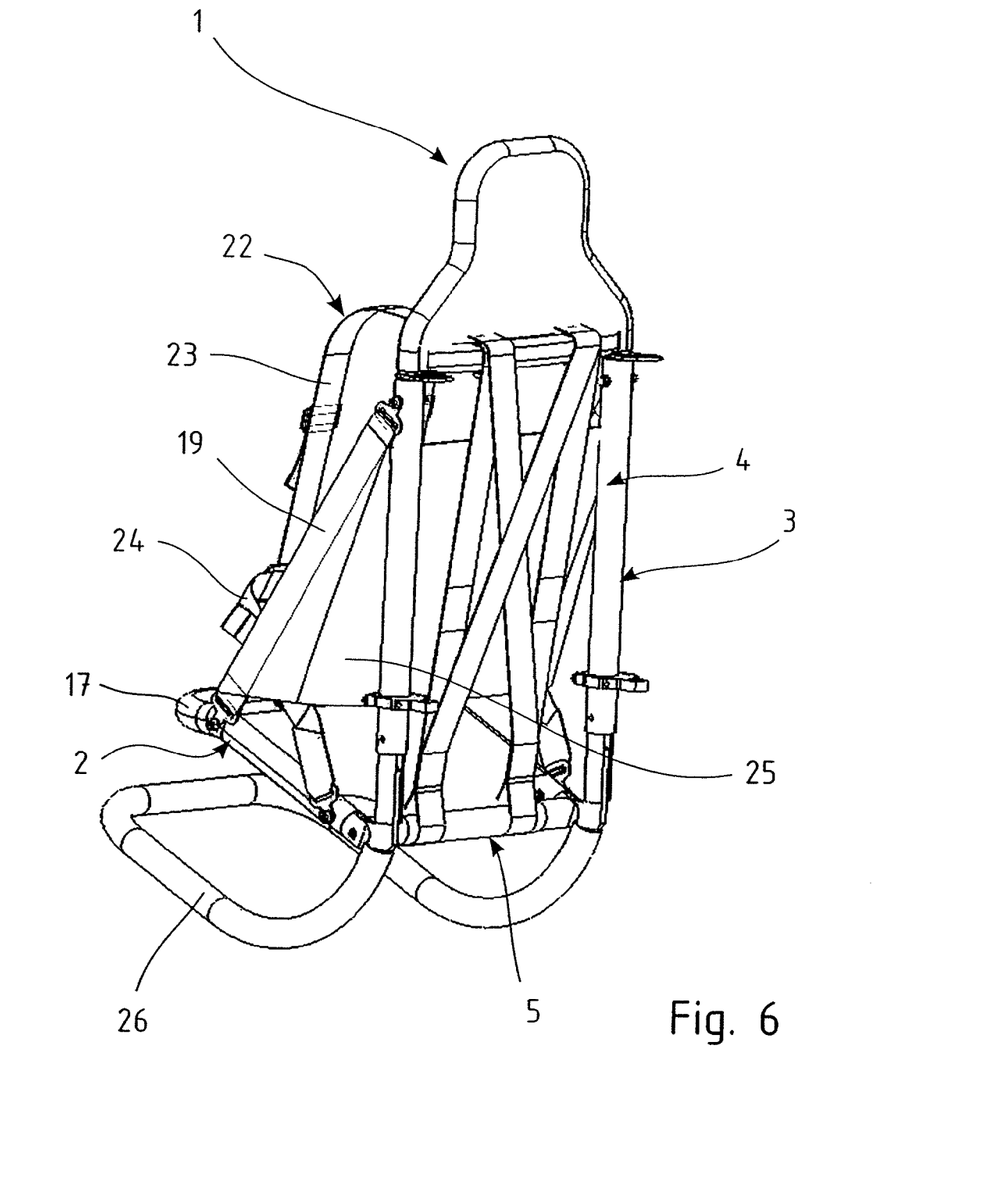
FIG. 6 shows the safety seat of FIG. 5 in a lowered position.
Figure 7:
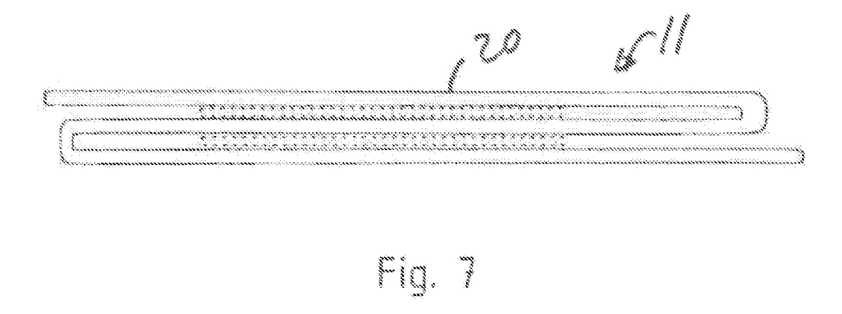
FIG. 7 is a side schematic view of a portion of a support strap including a tear seam.
Figure 8:
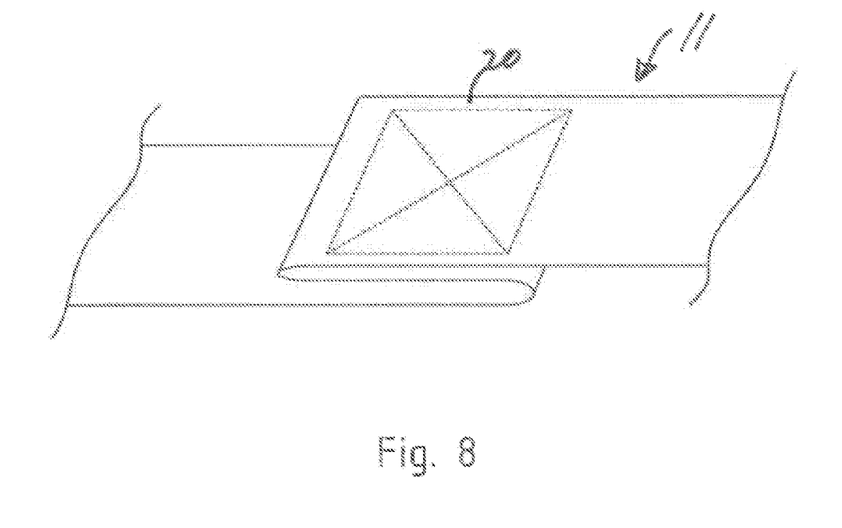
FIG. 8 is a schematic perspective view of the support strap and tear seam of FIG. 7.

The embodiment according to FIGS. 5 and 6 differs from that of FIGS. 3 and 4 by the addition of a footrest 26, which has a more-or-less U-shaped configuration and is connected to the connecting elements 15, 16. The footrest 26 begins on the side opposite the insertion profiles 13, 14, extends forward in an arc toward the seat unit 2, and then extends parallel to, and a certain distance below, the seat unit 2. The forward end of the footrest 26 is arranged in such a way that the occupant can comfortably place his feet on the curved, closed forward part of the footrest 26. It can be seen from FIG. 6 that, because of its rigid connection to the connecting elements 15, 16, the footrest 26 will shift in parallel with the seat unit 2. The footrest unit is not connected to the floor of the vehicle and drops at the same time that the rear part 18 of the seat unit 2 does.

The invention claimed is:

1. Safety seat for motor vehicles with the following features:
    (a) the safety seat (1) comprises a seat unit (2) and a back unit (3);
    (b) the back unit (3) comprises an upper part (4) and a lower part (5), wherein the safety seat (1) can be connected by way of the upper part (4) to the structure of a motor vehicle, and wherein the lower part (5) can be dropped with respect to the upper part (4) by telescoping relative to the upper part;
(c) the lower part (5) is guided on the upper part (4) and is connected to the upper part (4) by at least one energy-absorbing support strap (11);
(d) the seat unit (2) has a forward part (17), which is connected in articulated fashion to the upper part (4) of the back unit, and a rear part (18), which is connected in articulated fashion to the lower part (5) of the back unit (3), wherein the rear part (18) of the seat unit (2) is intended to drop farther than the forward part (17) of the seat unit (2) when a force resulting from an accident or an explosion acts on the motor vehicle.

2. Safety seat according to claim 1, characterized in that the support strap (11) comprises a strap section (20) with at least two layers of strap material lying on top of each other, which are connected to each other by at least one tear seam or adhesive bond configured to serve as a predetermined break point.

3. Safety seat according to claim 1, characterized in that a bracing strap (19) connects the forward part (17) of the seat unit (2) to the upper part (4) of the back unit (3), wherein the center of rotation (D) at which the bracing strap (19) is connected to the seat unit (2) is a greater horizontal distance away from the back unit (3) than the horizontal distance between the center of rotation (D) and the forward part (17) of the seat unit (2).

4. Safety seat according to claim 1, characterized in that a safety belt arrangement (22) with shoulder belts (23) is provided, wherein the shoulder belts (23) pass around the upper part (4) of the back unit (3) and can be pulled tight when the lower part (5) at the back unit (3) drops.

5. Safety seat according to claim 4, characterized in that the shoulder belts (23) are fastened to the lower part (5) of the back unit (3).

6. Safety seat according to claim 3, characterized in that the bracing straps (19) support a backrest unit (25) of textile fabric, which extends between the bracing straps (19).

7. Safety seat according to claim 1, characterized in that a footrest (26), which extends underneath, a certain distance away from, and parallel to the seat unit (2) without touching the floor of the motor vehicle, is connected to the lower part (5) of the back unit (3).

8. Safety seat according to claim 1, characterized in that the support strap (11) comprises means for indicating an overload.

9. Safety seat according to claim 1, characterized in that the predetermined break point of the support strap (11) has a falling load level.

10. Safety seat for motor vehicles with the following features:
(a) the safety seat (1) comprises a seat unit (2) and a back unit (3);
(b) the back unit (3) comprises an upper part (4) and a lower part (5), wherein the upper part (4) is rigidly connectable to the structure of a motor vehicle, and wherein the lower part (5) can be dropped with respect to the upper part (4);
(c) the lower part (5) is guided on the upper part (4) and is connected to the upper part (4) by at least one energy-absorbing support strap (11);
(d) the seat unit (2) has a forward part (17), which is connected in articulated fashion to the upper part (4) of the back unit, and a rear part (18), which is connected in articulated fashion to the lower part (5) of the back unit (3), wherein the rear part (18) of the seat unit (2) is intended to drop farther than the forward part (17) of the seat unit (2) when a force resulting from an accident or an explosion acts on the motor vehicle to cause the lower part (5) to drop with respect to the upper part (4).

* * * * *